United States Patent
Ross et al.

(10) Patent No.: US 9,720,156 B1
(45) Date of Patent: Aug. 1, 2017

(54) SENSORED FIBER REINFORCED POLYMER GRATE

(76) Inventors: Michael P. Ross, Albuquerque, NM (US); Thomas Kimball Mack, Albuquerque, NM (US)

(*) Notice: Subject to any disclaimer, the term of this patent is extended or adjusted under 35 U.S.C. 154(b) by 433 days.

(21) Appl. No.: 13/493,042

(22) Filed: Jun. 11, 2012

(51) Int. Cl.
*G02B 6/00* (2006.01)

(52) U.S. Cl.
CPC ............................. *G02B 6/00* (2013.01)

(58) Field of Classification Search
CPC ............................. G01M 11/83; G01M 11/85
USPC .................................................... 385/13
See application file for complete search history.

(56) References Cited

U.S. PATENT DOCUMENTS

| | | | |
|---|---|---|---|
| 4,603,252 A * | 7/1986 | Malek | B29C 37/00 250/227.14 |
| 5,592,149 A * | 1/1997 | Alizi | G08B 13/124 250/227.14 |
| 7,123,785 B2 | 10/2006 | Iffergan | |
| 7,402,790 B2 | 7/2008 | Browning, Jr. et al. | |
| 7,782,196 B2 | 8/2010 | Piper, Sr. et al. | |
| 8,135,245 B2 | 3/2012 | Rodriguez Erdmenger et al. | |
| 2007/0196059 A1 * | 8/2007 | Kojima | G01K 11/32 385/100 |
| 2008/0107888 A1 * | 5/2008 | Dry | 428/313.3 |

OTHER PUBLICATIONS

"Lightloc: The Leader in Underground Pathway Protection", Retrieved at <<http://www.lightloc.com/docs/SmartGrateTechnicalDetails.pdf>>, Retrieval date: Apr. 17, 2012, pp. 1-2.

* cited by examiner

*Primary Examiner* — Tina Wong
(74) *Attorney, Agent, or Firm* — Daniel J. Jenkins

(57) ABSTRACT

Various technologies described herein pertain to a sensored grate that can be utilized for various security fencing applications. The sensored grate includes a grate framework and an embedded optical fiber. The grate framework is formed of a molded polymer such as, for instance, molded fiber reinforced polymer. Further, the grate framework includes a set of elongated elements, where the elongated elements are spaced to define apertures through the grate framework. The optical fiber is embedded in the elongated elements of the grate framework. Moreover, bending or breaking of one or more of the elongated elements can be detected based on a change in a characteristic of input light provided to the optical fiber compared to output light received from the optical fiber.

20 Claims, 6 Drawing Sheets

SENSORED FIBER REINFORCED POLYMER GRATE

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

A sensored grate is a selective barrier with apertures there through. The apertures in the sensored grate, for instance, can be sized to restrict a human from passing through the apertures, while permitting a smaller animal to pass and water to flow through the apertures. The sensored grate can be equipped with an internal sensor that detects severe bends and complete breaks in the structure of such grate. For example, the internal sensor can indicate that a potential intruder is attempting to defeat the barrier formed by the sensored grate by breaking the structure of the grate, bending the structure of the grate to enlarge an aperture formed there through, or the like.

Sensored grates can be used in various security fencing applications. For example, such applications can range from securing culverts to forming segments of security perimeters, particularly through marshes, streams, and littoral zones. Sensored grates can also be used to detect vibrations of the grates; however, such vibration detection may be unsuitable for applications where a frequency of nuisance alarms may be high (e.g., water flow areas and areas where there is an absence of animal control).

Some conventional sensored grates include hollow structural elements that can be connected to form a framework. The hollow structural elements oftentimes are steel tubes. Assembly of such conventional sensored grates commonly involves connecting the steel tubes, and lacing an optical fiber through hollow cores of the steel tubes. However, these conventional sensored grates constructed of steel tubes can be expensive due to material costs and heavy because of the weight of the material. Moreover, such conventional sensored grates may be unsuitable for water applications, since a leak in a steel tube can allow water to fill the hollow cores within the grate and surround the optical fiber. Further, performance of the conventional sensored grates can be unpredictable; for example, how quickly the sensored grate can detect a bend or how far the structure of the sensored grate has to be bent prior to detection can vary depending upon positioning of the optical fiber within the hollow cores of the steel tubes during assembly.

SUMMARY

Described herein are various technologies that pertain to a sensored grate that can be utilized for various security fencing applications. The sensored grate includes a grate framework and an embedded optical fiber. The grate framework is formed of a molded polymer such as, for instance, molded fiber reinforced polymer. Further, the grate framework includes a set of elongated elements, where the elongated elements are spaced to define apertures through the grate framework. The optical fiber is embedded in the elongated elements of the grate framework. Moreover, bending or breaking of one or more of the elongated elements can be detected based on a change in a characteristic of input light provided to the optical fiber compared to output light received from the optical fiber.

According to various embodiments, a selective barrier system can include the sensored grate (or a plurality of sensored grates) and an optical processing unit. A continuous optical path can be formed from the optical processing unit, through the optical fiber(s) embedded in the sensored grate(s), and back to the optical processing unit. Accordingly, the optical processing unit can detect a change in a characteristic of input light provided to the optical path compared to output light received from the optical path.

In accordance with embodiments described herein, a sensored grate can be fabricated as a one-piece molded product with the optical fiber embedded therein. Placement of the optical fiber can be controlled during fabrication to provide dependable sensor activation and predictable alarm sensitivity. Moreover, the sensored grate can be fabricated to have various design characteristics (e.g., a manufacturer can have various degrees of design freedom for the sensored grate).

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
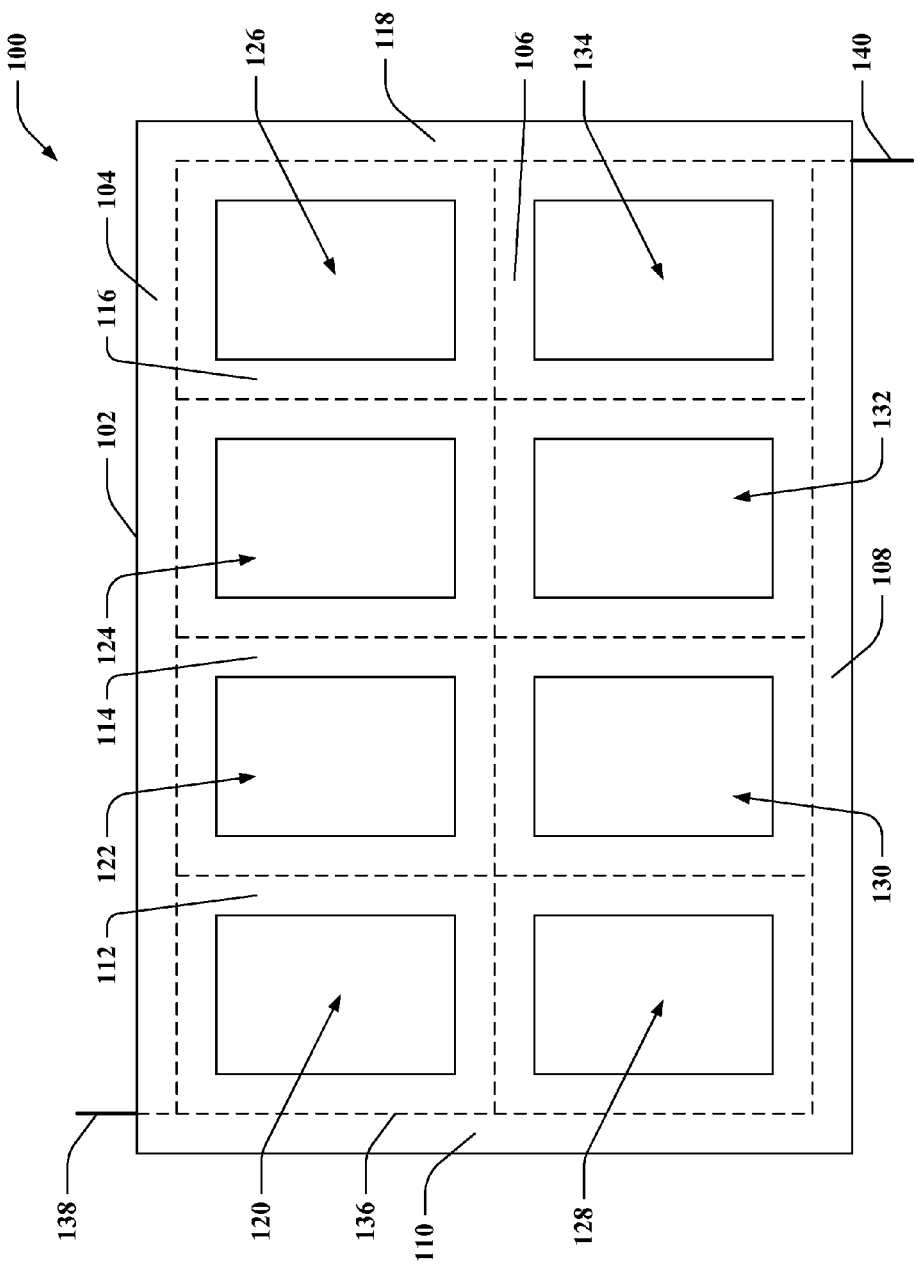
FIG. 1 illustrates a top view of an exemplary sensored grate.

Various technologies pertaining to a sensored grate that includes a grate framework and an optical fiber, where the optical fiber is embedded in the grate framework, are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As set forth herein, a sensored grate includes a grate framework that is formed of a molded polymer. The grate framework includes a set of elongated elements, which are spaced to define apertures through the grate framework. Moreover, an optical fiber is embedded in the elongated elements of the grate framework. Accordingly, bending or breaking of one or more of the elongated elements can be detected based on a change in a characteristic of input light provided to the optical fiber compared to output light received from the optical fiber. For example, a sensor function of the sensored grate can be based on attenuation of the light traversing throughout the optical fiber embedded within the elongated elements; however, it is contemplated that the sensor function can be additionally or alternatively based on changes in other characteristics of the light traversing throughout the optical fiber.

Referring now to the drawings, FIG. 1 illustrates a top view of an exemplary sensored grate 100. The sensored grate 100 includes a grate framework 102. The grate framework 102 includes a set of elongated elements that are spaced to define apertures through the grate framework 102. As shown in FIG. 1, the grate framework 102 includes an elongated element 104, an elongated element 106, an elongated element 108, an elongated element 110, an elongated element 112, an elongated element 114, an elongated element 116, and an elongated element 118 (collectively referred to as elongated elements 104-118). The elongated elements 104-118 are spaced to define an aperture 120, an aperture 122, an aperture 124, an aperture 126, an aperture 128, an aperture 130, an aperture 132, and an aperture 134 (collectively referred to as apertures 120-134). While FIG. 1 depicts an exemplary configuration of the grate framework 102 where eight apertures 120-134 are defined there through by eight elongated elements 104-118, it is to be appreciated that substantially any other configuration of the grate framework 102 is intended to fall within the scope of the hereto appended claims.

In the illustrated example of the grate framework 102, the set of elongated elements 104-118 includes a first subset of elongated elements and a second subset of elongated elements. The first subset of elongated elements includes the elongated element 104, the elongated element 106, and the elongated element 108. The second subset of elongated elements includes the elongated element 110, the elongated element 112, the elongated element 114, the elongated element 116, and the elongated element 118. The elongated elements 104-108 in the first subset are substantially parallel to each other. Moreover, the elongated elements 110-118 in the second subset are substantially parallel to each other. Further, the elongated elements 104-108 in the first subset are substantially perpendicular to the elongated elements 110-118 in the second subset to form a mesh. However, it is to be appreciated that the claimed subject matter is not so limited (e.g., the elongated elements 104-118 of the grate framework 102 need not form a mesh, etc.). Rather, a size, a shape, and a configuration of the grate framework 102 can be defined by a mold (e.g., used during fabrication). For example, the grate framework 102 can be designed based upon an application for which the sensored grate 100 may be used (e.g., the grate framework 102 can be round to fit a round man-hole cover, etc.).

The grate framework 102 is formed of a molded polymer. According to various embodiments, the grate framework 102 is formed of a molded fiber reinforced polymer (FRP). While many of the examples set forth herein pertain to the grate framework 102 being formed of the molded FRP, it is contemplated that the grate framework 102 can be formed of a different type of polymer other than FRP.

The molded FRP is a composite made from fiber reinforcement in a polymer matrix. The molded FRP can also include one or more additives. The type and configuration of fiber reinforcement, resin, and additives for the molded FRP can be selected for the matrix in order to produce composites with a variety of physical strengths and properties. Examples of the fiber reinforcements include, but are not limited to, glass fibers, carbon fibers, steel mesh, or other fillers. Moreover, examples of reactive resin systems include unsaturated vinyl ester resins cured with styrene, two component epoxy systems, reactive polyurethanes, or the like; yet, the claimed subject matter is not so limited. Further, examples of the additives are an anti-biofouling agent, a coloring agent, an ultraviolet protection agent, or the like.

When fabricating the sensored grate 100 with the grate framework 102 formed of the molded FRP, the reactive resin systems are applied to the fiber reinforcements and processed into reinforced cured polymers. The resins are applied to the fiber reinforcements while in liquid form in a suitable mold. Thereafter, the resins and fiber reinforcements are thermally cured into the reinforced material in the mold.

According to an illustration, an additive can be included in the molded FRP. Thus, the additive can be distributed throughout the molded FRP (e.g., throughout the grate framework 102). For instance, an anti-biofouling agent can be added to the liquid form of the polymer before curing such that the anti-biofouling agent can be distributed in depth throughout the grate framework 102. Additionally or alternatively, additives like a coloring agent or an ultraviolet protection agent can be added to the liquid form of the polymer before curing. Thus, rather than being applied in an external layer or coat on top of the sensored grate 100 (e.g., which can chip, degrade, etc. thereby exposing the underlying sensored grate 100), one or more of the foregoing additives can be included throughout the sensored grate 100. Yet, it is also contemplated that one or more additives can additionally or alternatively be included in an external layer or coat on top of the sensored grate 100.

Moreover, an optical fiber 136 is at least partially embedded in the elongated elements 104-118 of the grate framework 102. The portion of the optical fiber 136 that is embedded in the elongated elements 104-118 is represented as a dotted line in FIG. 1. The optical fiber 136 can also include an optical fiber input 138 and an optical fiber output 140. The optical fiber 136 provides a continuous optical path without diversion from the optical fiber input 138 to the optical fiber output 140.

The optical fiber input 138 and the optical fiber output 140 can be external to the grate framework 102; however, it is contemplated that the optical fiber input 138 and/or the optical fiber output 140 can be internal to the grate framework 102 (e.g., the optical fiber input 138 and/or the optical fiber output 140 can be connector(s) embedded within the grate framework 102 to which external optical fiber(s) can be coupled, etc.). The optical fiber input 138 can be directly or indirectly coupled with an optical fiber of a disparate sensored grate, an optical processing unit, or the like. Similarly, the optical fiber output 140 can be directly or indirectly coupled with an optical fiber of a disparate sensored grate, an optical processing unit, or the like. While shown at opposite corners of the grate framework 102, it is contemplated that the optical fiber input 138 and the optical fiber output 140 can be located at substantially any positions relative to each other.

The optical fiber 136 is the sensor mechanism for the sensored grate 100. The sensor mechanism is based on the passage of light through the optical fiber 136 and comparing the input and output light characteristics. Examples of such characteristics include, but are not limited to, intensity, phase, polarization, wavelength, and transit time. According to an illustration, a change in intensity of light inputted to the optical fiber 136 compared to light outputted from the optical fiber 136 can be measured. Following this illustration, whether the sensored grate 100 is severely bent or broken can be detected as a function of the measured change in intensity (e.g., attenuation of the light passing through the optical fiber 136).

Further, the sensored grate 100 is a one-piece sensored grate. Thus, the sensored grate 100, having the grate framework 102 and the optical fiber 136 embedded therein, is constructed as a one-piece molded product. According to various illustrations, the elongated elements 104-118 need not be connected by welding, gluing, etc. to construct the grate framework 102, the optical fiber 136 need not be added into an interior of the grate framework 102 after construction of the grate framework 102 to form the sensored grate 100, and so forth.

The sensored grate 100 is a molded product that can be created in layers of liquid polymer resin and fiber reinforcement. Moreover, the optical fiber 136 can be strategically placed within the layers of resin and fiber reinforcement. The optical fiber 136 runs in a continuous loop through the elongated elements 104-118 that form the grate framework 102 of the sensored grate 100. As the composite cures from liquid to solid form, the optical fiber 136 remains firmly embedded in the solid structure of the grate framework 102.

The apertures 120-134 of the sensored grate 100 can each be sized as having a respective area that is smaller than a minimum area through which a human body can pass. Moreover, if one (or more than one) of the apertures 120-134 is forced larger, then the grate framework 102 around such aperture will bend, and thus, start stretching and bending the optical fiber 136 embedded therein. Moreover, breaking of the optical fiber 136 or severe restriction of light traversing along an optical path of the optical fiber 136 due to bending of the optical fiber 136 can be detected (e.g., by an optical processing unit described herein).

A manufacturer of the sensored grate 100 can have various degrees of design freedom when producing the sensored grate 100; thus, the sensored grate 100 can be fabricated to have varying design characteristics. For instance, the sensored grate 100 can be designed and produced in substantially any overall height, width, or depth. According to another example, the sensored grate 100 can be designed and produced with substantially any configuration of the apertures 120-134. By way of yet another example, the type and configuration of reinforcement, resin, and/or additives can be selected for the matrix in order to produce composites with a variety of physical strengths and properties. In accordance with yet another example, the optical fiber 136 can be chosen based upon desired sensor activation characteristics (e.g., sensitivity of detecting a bend of an elongated element can be a function of characteristics of the optical fiber 136 selected for insertion in the sensored grate 100).

The sensored grate 100 can have a long product life since polymers are nonporous when cured (e.g., the grate framework 102 can provide protection of the optical fiber 136 from external elements) and offer minimal degradation in corrosive environments. In comparison to steel used for many conventional sensored grates, FRP typically is lighter weight and more resistant to corrosion. Moreover, FRP typically has fewer problems relative to heat, stress, thermal expansion, conductivity, and climate conditions compared to steel. Further, in contrast to steel, FRP can have lower life-cycle costs, higher strength-to-weight ratios, and greater resistance to impact while being electronically transparent and lower maintenance.

Further, the sensored grate 100 can provide a low nuisance alarm rate. Accordingly, visual assessments of alarms may be mitigated. This can be particularly useful for applications that place the sensored grate 100 or a portion thereof under water.

Figure 2:
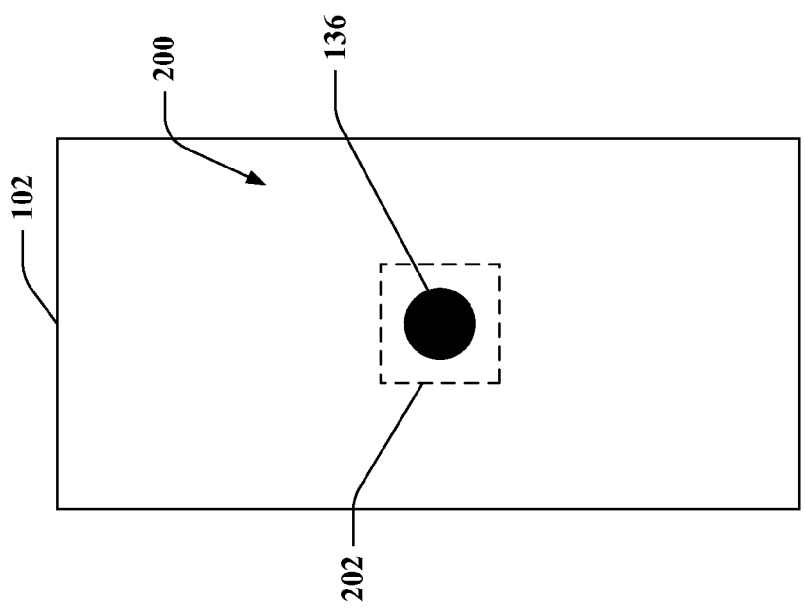
FIG. 2 illustrates a cross-section of a grate framework with an optical fiber embedded therein.

Now referring to FIG. 2, illustrated is a cross-section of the grate framework 102 with the optical fiber 136 embedded therein. More particularly, FIG. 2 shows a cross-section of one of the elongated elements 104-118 of the grate framework 102 with the optical fiber 136 embedded therein. As noted herein, the grate framework 102 can be made of a molded FRP 200; however, it is also to be appreciated that the grate framework 102 can be made of a different type of molded polymer.

The grate framework 102 surrounds the optical fiber 136. In particular, an outermost layer of the optical fiber 136 interfaces with an internal surface of the molded FRP 200 of the grate framework 102; thus, the outermost layer of the optical fiber 136 is fixed to the internal surface of the grate framework 102 and/or firmly surrounded by the internal surface of the grate framework 102.

In contrast, conventional sensored grates oftentimes include hollow cores through which an optical fiber can be placed; however, in such conventional sensored grates, the optical fiber is typically not fixed to an internal surface or firmly surrounded by an internal surface within the hollow cores. Accordingly, conventional sensored grates may be less sensitive for detecting a bend when the bend starts. By way of illustration, the optical fiber may be loosely laced through the hollow cores of a conventional sensored grate. Following this illustration, the grate may begin to be bent, but due to optical fiber slack and the optical fiber not being fixed within the hollow core, the bending of the grate may not cause the optical fiber to be deformed; accordingly, the beginning of such bending may be unable to be detected. Moreover, conventional sensored grates may be less predictable concerning how fast a bend can be detected, an amount of a bend that needs to occur before such bend is sensed, etc. Such lack of predictability can be a function of less control over placement of the optical fiber within the conventional sensored grates, for instance.

Figure 3:
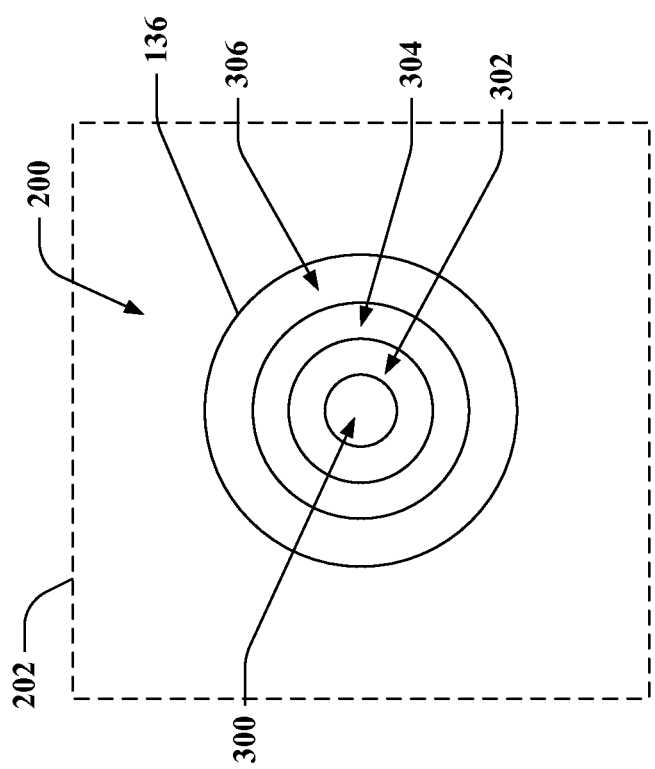
FIG. 3 illustrates an enlarged cross-sectional view of a portion of the grate framework depicted in FIG. 2.

An enlarged cross-sectional view of a portion of the grate framework 102 depicted in FIG. 2 along dotted line 202 is illustrated in FIG. 3. Again, the optical fiber 136 is embedded within (e.g., fixed to, firmly surrounded by, etc.) the molded FRP 200 of the grate framework 102. As shown, the outermost layer of the optical fiber 136 interfaces with the internal surface of the molded FRP 200 of the grate framework 102.

Sensitivity of the sensored grate 100 of FIG. 1 can be based on characteristics of the optical fiber 136 embedded in the grate framework 102. The optical fiber 136 includes a core 300. The core 300 is a glass or plastic cylindrical core. Moreover, the core 300 provides an optical path for light to traverse along an axis of the optical fiber 136.

The optical fiber 136 further includes a cladding 302 that surrounds the core 300. The cladding 302 can be a glass or plastic layer surrounding the core 300. Further, the cladding 302 forms a boundary for the optical path, thereby causing light to remain within the core 300. To confine the light in the core 300, a refractive index of the core 300 is greater than that of the cladding 302. Further, it is contemplated that the boundary between the core 300 and the cladding 302 can be abrupt (e.g., step-index fiber) or gradual (e.g., graded-index fiber).

The optical fiber 136 also includes one or more additional layers that surround the cladding 302. In the depicted example of FIG. 3, a buffer 304 surrounds the cladding 302, and a jacket 306 surrounds the buffer 304. Yet, it is contemplated that the optical fiber 136 can include more or less additional layers that surround the cladding 302. Further, an external surface of an outermost layer of the one or more additional layers interfaces with an internal surface of the molded FRP 200 of the grate framework 102. Thus, the outermost layer of the optical fiber 136 forms an interface with the surrounding hardened FRP material.

An amount of slack or excess length of the core 300 and cladding 302 is a parameter that can determine a point at which the optical path will break as the length of the core 300 and cladding 302 of the optical fiber 136 is stretched under tensile load to a point of failure. Such slack or excess length of the core 300 and cladding 302 can be referred to as excess fiber length (EFL). It is contemplated that the EFL of the optical fiber 136 is a design parameter that can be selected for a sensored grate being designed and produced.

Although not shown, it is contemplated that in some embodiments the optical fiber 136 can have more than one core within an outermost layer (e.g., within a jacket). Accordingly, each of the cores can be surrounded by a corresponding cladding. Yet, it is to be appreciated that the claimed subject matter is not limited to the foregoing.

Figure 4:
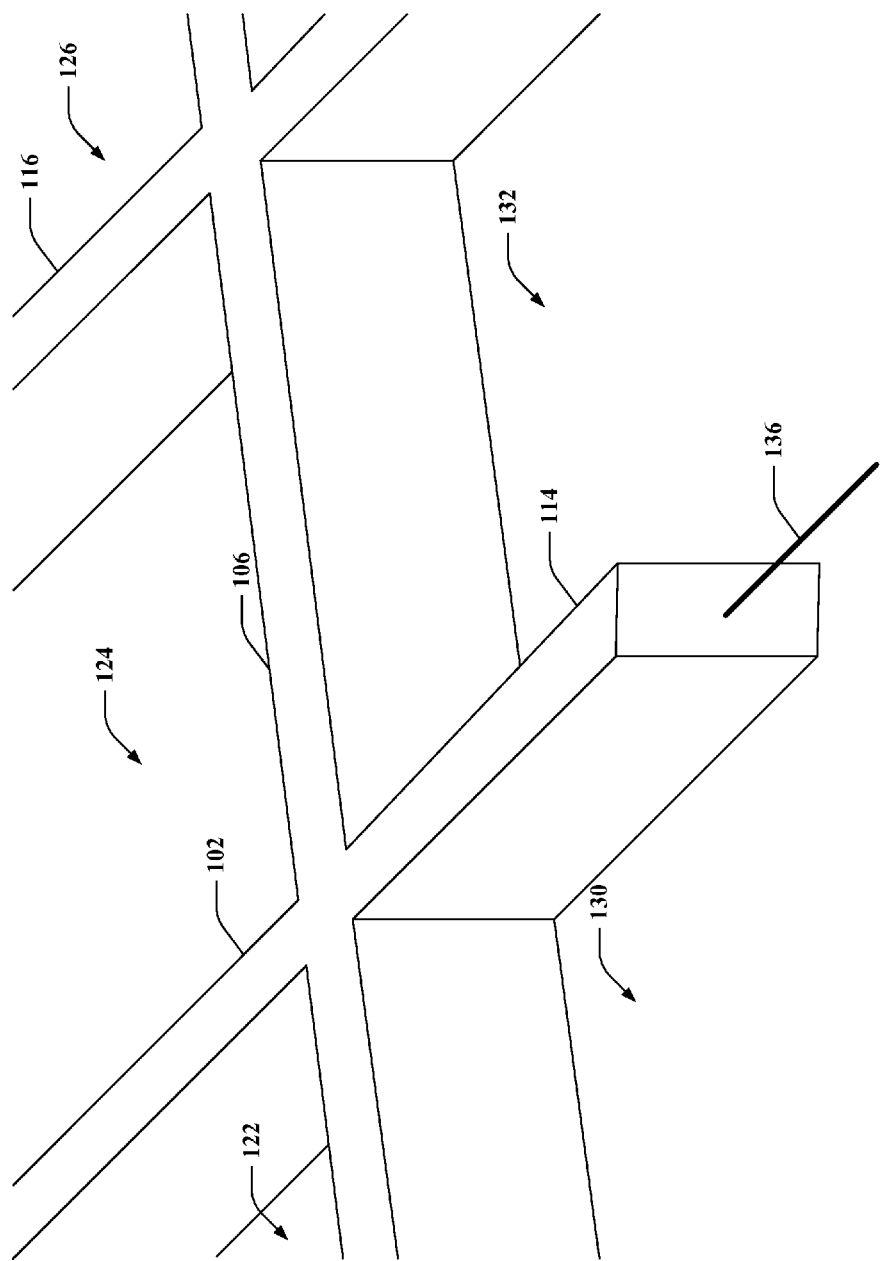
FIG. 4 illustrates a three-dimensional cut-away view of a portion of the sensored grate of FIG. 1.

Turning to FIG. 4, illustrated is a three-dimensional cut-away view of a portion of the sensored grate 100 of FIG. 1. As set forth herein, the optical fiber 136 is embedded in the grate framework 102. The cut-away view shows the optical fiber 136 embedded within the elongated element 114. Although not depicted, it is contemplated that the optical fiber 136 can similarly be embedded in other elongated elements of the grate framework 102.

The optical fiber 136 can be positioned substantially anywhere within the elongated elements of the grate framework 102 (e.g., in a height direction and/or a width direction of the elongated elements). For instance, the optical fiber 136 can be positioned at or near a middle of an elongated element in the height and width directions as shown in FIG. 4 (e.g., away from walls of the sensored grate 100); yet, it is to be appreciated that the optical fiber 136 can be positioned elsewhere within an elongated element.

Since the sensored grate 100 is fabricated from a mold in a one-piece construction with the optical fiber 136 embedded in the grate framework 102, placement of the optical fiber 136 throughout the grate framework 102 can be controlled. Such control of the placement of the optical fiber 136 within the grate framework 102 can provide dependable sensor activation and predictable alarm sensitivity. Moreover, controlling the placement of the optical fiber 136 can minimize optical signal loss (e.g., by managing bends of the optical fiber 136 around turns between elongated elements, straightening the optical fiber 136 along a length of an elongated element, etc.) and keep the optical fiber 136 away from walls of the grate framework 102.

Figure 5:
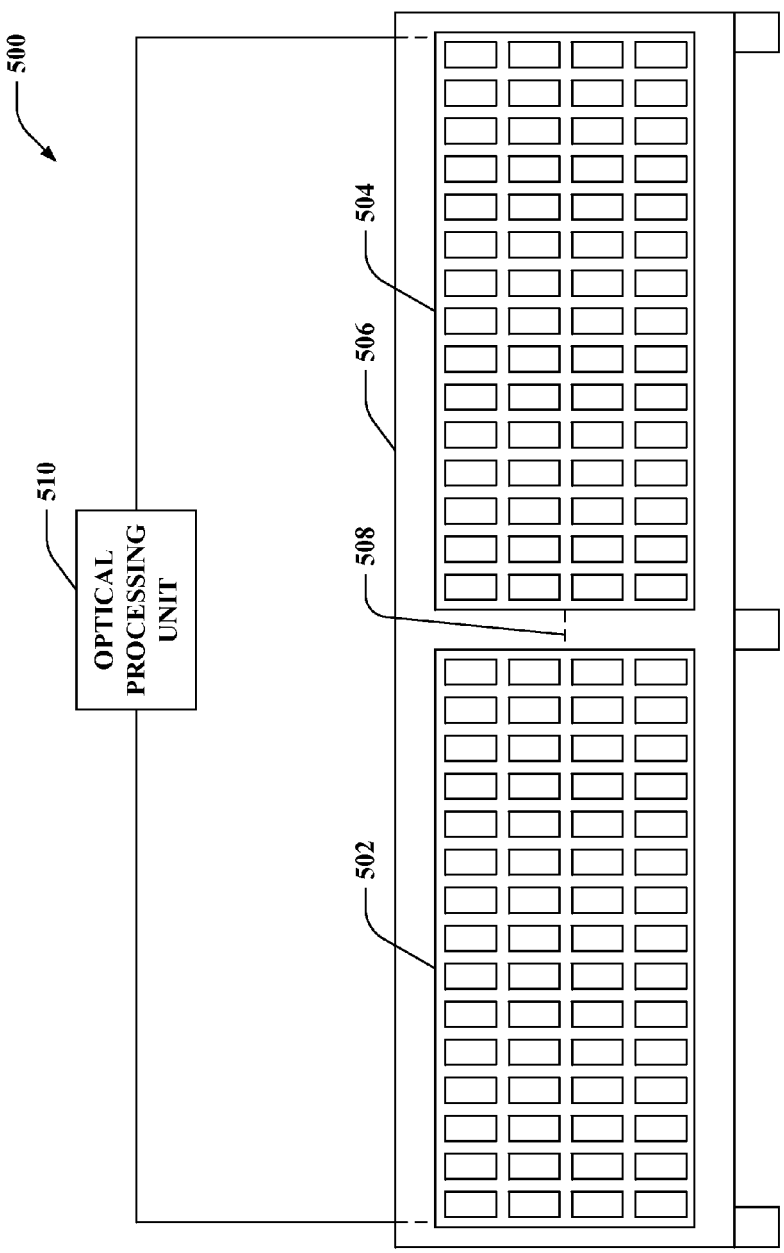
FIG. 5 illustrates a diagram depicting an exemplary selective barrier system that senses severe bends and breaks in sensored grates.

Now referring to FIG. 5, illustrated is a selective barrier system 500 that senses severe bends and breaks in sensored grates. The selective barrier system 500 can include one or more sensored grates that can be used for various security fencing applications. In the illustrated example of FIG. 5, the selective barrier system 500 is shown as including two sensored grates, namely, a sensored grate 502 and a sensored grate 504 (collectively referred to as sensored grates 502-504); however, it is to be appreciated that the selective barrier system 500 can include one sensored grate (e.g., the optical fiber input 138 and the optical fiber output 140 of the sensored grate 100 can be connected to an optical processing unit 510) or more than two sensored grates. Moreover, each of the sensored grates 502-504 can be similar to the sensored grate 100 of FIG. 1 (although configured with a different number of apertures there through, a different number of elongated elements, etc.).

A frame 506 can house the sensored grates 502-504, for example. Yet, it is to be appreciated that the claimed subject matter is not limited to use of a frame.

Moreover, optical fibers embedded in the sensored grates 502-504 can be connected. For example, an optical fiber output of one of the sensored grates 502-504 can be connected to an optical fiber input of the other one of the sensored grates 502-504 (as represented by dotted line 508).

Further, an optical processing unit 510 can be connected to the optical fibers embedded in the sensored grates 502-504. Accordingly, an optical fiber loop can be formed in the selective barrier system 500. The optical fiber loop can run from an output of the optical processing unit 510, through the optical fiber embedded in one of the sensored grates 502-504, through the optical fiber embedded in the other one of the sensored grates 502-504, and back to the optical processing unit 510. The optical fiber loop is a continuous loop without a diversion. Accordingly, the optical fiber loop and the optical processing unit 510 can detect a bend or break of one or more elongated elements of one or more of the sensored grates 502-504.

As illustrated, the optical processing unit 510 can be located external to the sensored grates 502-504. However, in accordance with other embodiments (not shown), it is to be appreciated that the optical processing unit 510 can be included in one or more of the sensored grates 502-504.

The optical processing unit 510 can inject a known light source with specific characteristics into one end of the optical fiber loop. Moreover, the optical processing unit 510 can measure characteristics of the light exiting from the other end of the optical fiber loop. Further, the optical processing unit 510 can detect changes in characteristics in order to determine an alarm.

The optical processing unit 510 can measure an output without stresses applied to the sensored grates 502-504; such measurement can be recorded as a baseline (e.g., in memory). Further, the optical processing unit 510 compares light characteristics as one or more of the sensored grates 502-504 are stressed to the baseline light characteristics. Moreover, threshold trigger points used by the optical processing unit 510 for the comparison can be adjustable and predefined.

The optical processing unit 510 can detect a bend or a break of an elongated element of one of the sensored grates 502-504. The detection of a bend or break can be based on catastrophic failure of the core of the optical fiber embedded in the elongated element of a grate framework of such sensored grate. The catastrophic failure can occur, for instance, when the core is pulled beyond its structural limitations in the longitudinal direction, cut, or severely bent. Accordingly, when the optical processing unit 510 detects a break in the core of the optical fiber (e.g., limited or no light received from the optical fiber loop by the optical processing unit 510) or a predetermined set level of signal loss indicative of a threshold amount of bending of the core, then an alarm can be generated.

According to an example, the sensored grates 502-504 cause the optical processing unit 510 to generate an alarm (e.g., due to the optical path breaking or light in the optical path being severely restricted) before an area of an aperture expands to a minimum area through which a human can pass. By way of another example, the sensored grates 502-504 cause the optical processing unit 510 to generate an alarm when any elongated element of the grate frameworks of the sensored grates 502-504 around an aperture through the sensored grates 502-504 is cut, thus severing the optical fiber embedded therein.

Figure 6:
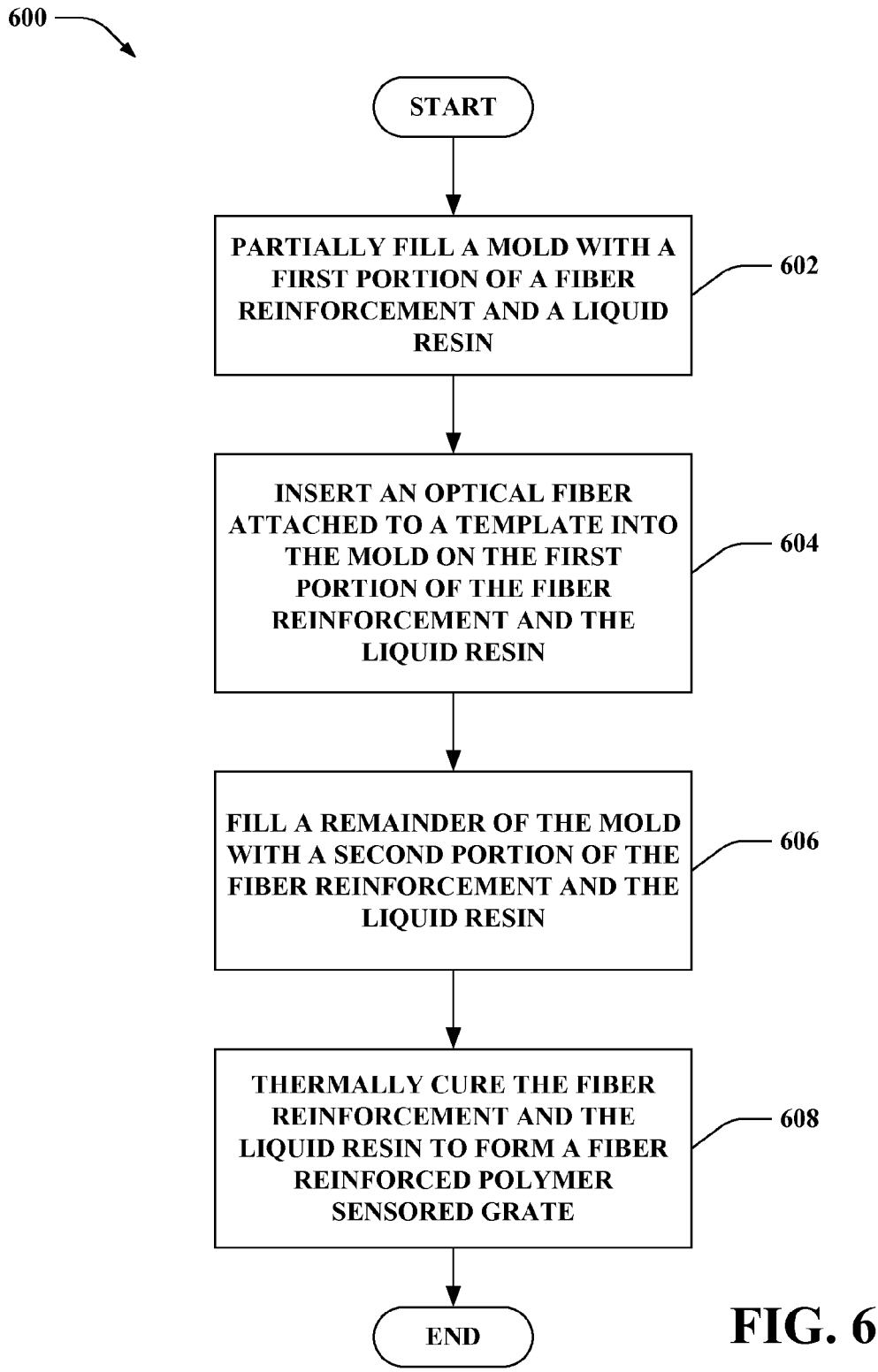
FIG. 6 is a flow diagram that illustrates an exemplary methodology for fabricating a fiber reinforced polymer sensored grate.

FIG. 6 illustrates an exemplary methodology relating to fabricating a fiber reinforced polymer sensored grate. While the methodology is shown and described as being a series of acts that are performed in a sequence, it is to be understood and appreciated that the methodology is not limited by the order of the sequence. For example, some acts can occur in a different order than what is described herein. In addition, an act can occur concurrently with another act. Further, in some instances, not all acts may be required to implement a methodology described herein.

FIG. 6 illustrates a methodology 600 for fabricating a fiber reinforced polymer sensored grate. At 602, a mold can be partially filled with a first portion of a fiber reinforcement and a liquid resin. For instance, the mold forms a grate framework that includes a set of elongated elements positioned to define apertures through the grate framework. At 604, an optical fiber attached to a template can be inserted into the mold on the first portion of the fiber reinforcement and the liquid resin. The template can control placement of the optical fiber within the mold. At 606, a remainder of the mold can be filled with a second portion of the fiber reinforcement and the liquid resin. According to an example, amounts of the first portion of the of the fiber reinforcement and the liquid resin and the second portion of the fiber reinforcement and the liquid resin can be substantially similar; yet, the claimed subject matter is not so limited. At 608, the fiber reinforcement and the liquid resin can be thermally cured to form the fiber reinforced polymer sensored grate.

By way of example, an additive can be mixed with the first portion of the fiber reinforcement and the liquid resin and with the second portion of the fiber reinforcement and the liquid resin. Following this example, the additive can be one or more of an anti-biofouling agent, a coloring agent, an ultraviolet protection agent, or the like.

Further, as used herein, the term "exemplary" is intended to mean "serving as an illustration or example of something."

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A sensored grate, comprising:
   a grate framework that comprises a set of elongated elements, wherein the elongated elements are spaced to define apertures through the grate framework, and wherein the grate framework is formed of a molded polymer; and
   an optical fiber having an outermost layer embedded in and fixed to the elongated elements of the grate framework, wherein all cross-sections of the optical fiber embedded in the elongated elements are in fixed contact with an internal surface of the elongated elements, and wherein at least one of bending or breaking of one or more of the elongated elements is detected based on a change in a characteristic of input light provided to the optical fiber compared to output light received from the optical fiber;
   wherein the optical fiber does not include a releasable modifying agent;
   wherein the grate framework has an internal surface; and
   wherein the outermost layer of the optical fiber is fixed to the internal surface of the grate framework.

2. The sensored grate of claim 1, wherein the grate framework is formed of a molded fiber reinforced polymer (FRP).

3. The sensored grate of claim 2, wherein the grate framework further comprises an anti-biofouling agent throughout the molded FRP.

4. The sensored grate of claim 2, wherein the grate framework further comprises a coloring agent throughout the molded FRP.

5. The sensored grate of claim 2, wherein the grate framework further comprises an ultraviolet protection agent throughout the molded FRP.

6. The sensored grate of claim 2, wherein the molded FRP is a composite made from fiber reinforcement in a polymer matrix.

7. The sensored grate of claim 6, wherein the fiber reinforcement comprises one or more of glass fibers, carbon fibers or steel mesh.

8. The sensored grate of claim 1, wherein the sensored grate is a one-piece sensored grate.

9. The sensored grate of claim 1, wherein the optical fiber provides a continuous optical path without diversion from an optical fiber input to an optical fiber output.

10. The sensored grate of claim 9, wherein the change in the characteristic of the input light provided to the optical fiber compared to the output light received from the optical fiber is one or more of a change in intensity, phase, polarization, wavelength, or transit time.

11. The sensored grate of claim 1, wherein placement of the optical fiber throughout the grate framework is controlled.

12. The sensored grate of claim 1, wherein the grate framework has a size, a shape, and a configuration defined by a mold.

13. The sensored grate of claim 1, wherein the optical fiber comprises:
   a core;
   a cladding that surrounds the core; and at least one additional layer that surrounds the cladding, wherein an external surface of an outermost layer of the at least one additional layer interfaces with an internal surface of the molded polymer of the grate framework.

14. A selective barrier system, comprising:
a sensored grate that comprises a grate framework and an optical fiber embedded in and fixed to the grate framework, wherein the grate framework is formed of a molded fiber reinforced polymer and comprises a set of elongated elements spaced to define apertures through the grate framework, wherein the elongated elements comprise an internal surface, wherein the optical fiber is embedded within the elongated elements in the set, and wherein the optical fiber comprises an outermost layer fixed to the internal surface of the elongated elements; and
an optical processing unit that detects at least one of a bend or a break of one or more of the elongated elements of the sensored grate;
wherein the optical fiber does not include an adhesive between the outermost layer of the optical fiber and the internal surface of the grate framework.

15. The selective barrier system of claim 14, wherein the sensored grate is a one-pieced molded product.

16. The selective barrier system of claim 14, wherein the grate framework comprises an additive throughout the molded FRP.

17. The selective barrier system of claim 14, further comprising a second sensored grate that comprises a second grate framework and a second optical fiber embedded in the second grate framework, wherein an optical fiber loop runs from the optical processing unit, through the optical fiber embedded in the grate framework, through the second optical fiber embedded in the second grate framework, and back to the optical processing unit.

18. The selective barrier system of claim 14, wherein the optical processing unit detects a change in a characteristic of input light provided to the optical fiber compared to output light received from the optical fiber to determine an alarm.

19. A method of fabricating a fiber reinforced polymer sensored grate, comprising:
partially filling a mold with a first portion of a fiber reinforcement and a liquid resin, wherein the mold forms a grate framework that comprises a set of elongated elements positioned to define apertures through the grate framework;
inserting an optical fiber attached to a template into the mold on the first portion of the fiber reinforcement and the liquid resin, wherein the template controls placement of the optical fiber within the mold;
filling a remainder of the mold with a second portion of the fiber reinforcement and the liquid resin; and
thermally curing the fiber reinforcement and the liquid resin to form the fiber reinforced polymer sensored grate fixed to the optical fiber in place where the optical fiber cannot move within walls of the set of elongated elements;
wherein the optical fiber does not include an adhesive; and
wherein the fiber reinforced polymer sensor grate continuously surrounds the optical fiber.

20. The method of claim 19, further comprising:
mixing an additive with the first portion of the fiber reinforcement and the liquid resin and with the second portion of the fiber reinforcement and the liquid resin, wherein the additive comprises one or more of an anti-biofouling agent, a coloring agent, or an ultraviolet protection agent.

* * * * *